Patented Nov. 6, 1934

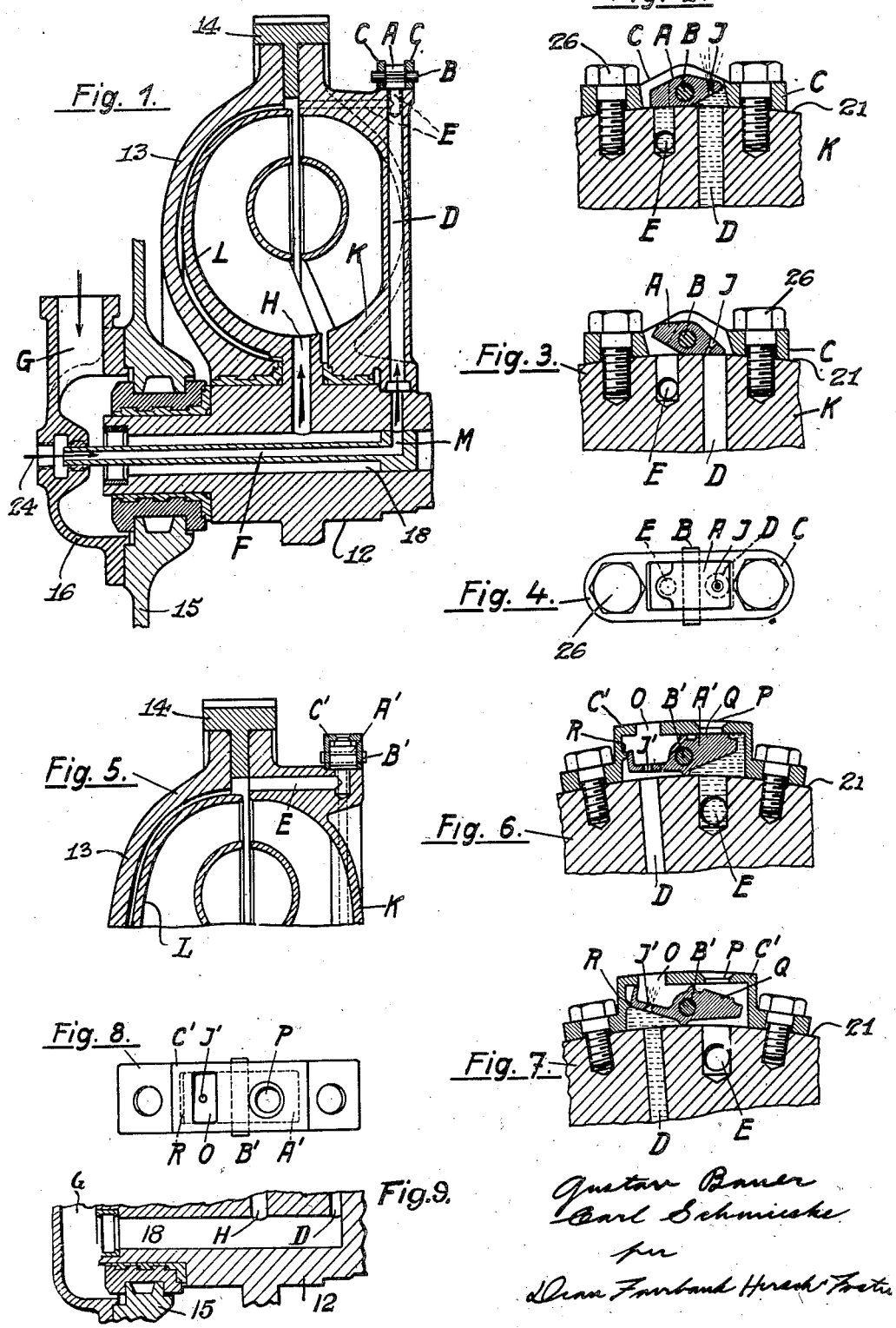

1,979,930

UNITED STATES PATENT OFFICE 1,979,930

POWER TRANSMITTER

Gustav Bauer, Hamburg, and Carl Schmieske, Bremen, Germany

Application May 11, 1933, Serial No. 670,530
In Germany May 11, 1932

10 Claims. (Cl. 60—54)

This invention relates to hydraulic couplings of the Föttinger type, such as is illustrated and broadly claimed in the Föttinger Patent 1,199,359, and relates more particularly to the means for effecting the filling and emptying of the working chamber.

In a hydraulic coupling of the Föttinger type there are employed two coaxial juxtaposed cup-shaped members which are free for relative rotation and which together form the working chamber. One is driven and serves to effect the circulation of the liquid and the other is driven by the liquid. By withdrawing the liquid from the working chamber the transmission of power may be substantially or wholly interrupted and the driven member brought to rest without stopping the driving member.

Various schemes have been proposed for controlling the admission and escape of liquid from the working chamber; for instance, by a movable ring valve carried by and encircling one of the members, as for instance in Patent 1,860,701, to Bauer et al., or by a separate rotary valve at each outlet as in Patent 1,866,424 to Schmieske, or by hydraulically operated valves as in Patent 1,780,613 to Bauer and Schmieske.

The objects of the present invention are to simplify the valve construction, to permit of its more effective operation by fluid pressure, and to provide a simple valve construction which may be inspected while the coupling is in operation and which may be readily applied to or removed from the coupling as desired and in case of need for repair or replacement.

In our improved construction there is provided a double flap valve which has one flap serving for opening or closing a discharge port of the coupling and the other flap adapted to be actuated by fluid pressure.

In the accompanying drawing there is illustrated certain embodiments of the present invention.

In the drawing:

Fig. 1 is a central longitudinal section through a portion of the coupling embodying our invention.

Fig. 2 is a transverse sectional detail showing the discharge port in closed position.

Fig. 3 is a section similar to Fig. 2, but showing the discharge port in open position.

Fig. 4 is a plan view of the valve mechanism shown in Figs. 1, 2 and 3.

Figs. 5 to 8 are corresponding views of a different form, and

Fig. 9 is a section similar to a part of Fig. 1, but with a single supply of liquid.

In the form shown in Figs. 1, 2, 3 and 4 there is provided a coupling having a pair of members K and L, one serving as the driving member and the other as the driven member. One of the members, for instance, the member L, is rigidly secured to or formed integral with a shaft 12, while the other member K includes a casing section 13 enclosing the member L and provided with a peripheral gear 14 serving to be driven from the shaft 12 through the hydraulic coupling or to drive the shaft 12 through the coupling. The details of the coupling as so far described may be of any form commonly employed in this art and constitute no novel portion of the present invention.

In the construction illustrated, the coupling is enclosed in a casing 15 which provides a bearing for one end of the shaft 12. Secured to this casing is a cap 16 provided with an inlet G for fluid, and the interior of the cap communicates with a passage 18 extending lengthwise of the shaft and having a branch passage H leading to the interior of the coupling. The conduit formed of the sections G, 18 and H serves for the filling of the coupling.

As an important feature of our invention, one of the members, for instance the member K, is provided with a plurality of outlet passages E leading to a peripheral surface 21 on the coupling. The member K also has a passage D leading to the same peripheral surface 21 and adjacent to the passage E. This passage D leads radially inwardly to the interior of the shaft 12 and communicates with a conduit F extending axially through the shaft and through the cap 16 to a separate liquid inlet 24. The conduit F may be rigid with the shaft and may be rotatably mounted in the wall of the cap 16.

Secured to the peripheral surface 21 is a plate or bracket C which may be held in place by cap screws 26 or in any other suitable manner. The plate has an opening therethrough communicating with the passages E and D, and pivotally mounted in said opening is a double flap valve A one end of which may close the passage E and the other end of which may substantially or wholly close the passage D. Preferably the passage D is of larger diameter than the passage E and the end of the flap valve A adjacent to the passage D may have a comparatively small opening J therethrough.

When it is desired to fill the coupling, that is, to put it into operation, suitable valves are opened to permit the delivery of liquid through the inlets G and 24. The liquid rapidly fills the conduit F and passage D and exerts pressure radially outwardly on one end of the flap valve so as to tilt the latter and close the outlet port E. During the operation of the coupling the fluid is pressed outward continuously through the passage D so as to continuously exert pressure on the flap valve and hold it in the position shown in Fig. 2. There is a slight loss of fluid through the port J or between the end of the flap valve and the adjacent wall of the plate C and thus liquid is continuously delivered, but at a comparatively low rate to the inlet 24. The opening J may be entirely omitted if there be sufficient clearance between the flap valve and the side of the casing, as such clearance would provide the small opening permitting continuous leakage. There may be slight leakage from the port E beneath the sides of the flap valve so as to permit the coupling to be completely filled and air to escape during the filling operation.

When it is desired to empty the coupling, it is merely necessary to shut off the supply of liquid to the inlet ports G and 24. The liquid remaining in the conduit F and passage D will rapidly escape past the flap valve and there will then be no further pressure exerted tending to hold the valve in the position shown in Fig. 2. The action of centrifugal force on the liquid in the passage E will shift the flap valve to the position shown in Fig. 3 and the liquid from the coupling may freely escape. The coupling may thus be quickly filled or emptied merely by opening or closing the supply valves leading to the inlets G and 24.

The flap valve is shown as pivotally mounted on a pin B in the detachable plate or valve casing C which is detachably secured to the periphery of the coupling member K. In case any flap valve fails to operate satisfactorily the valve and its casing may be very easily removed by withdrawing the screws 26 and a new one substituted. Furthermore the operation of the flap valves may be readily observed through a peephole in the outer casing or housing of the coupling.

It is not essential to provide the separate inlet 24 and conduit F in all cases. They may be entirely omitted as shown in Fig. 9 in which case the admission of liquid through the port G will rapidly fill the passage D and close the valve before any substantial amount of liquid can enter the coupling through the passage H, and the action of centrifugal force on the liquid in the passage D will keep the flap valve in the position shown in Fig. 2.

When it is desired to empty the coupling it is merely necessary to shut off the supply at the inlet G and the small amount of liquid in the conduit D will rapidly escape thus relieving the flap valve of fluid pressure on one end and permit the fluid pressure exerted through the passage E to open the valve. It is important that centrifugal force have a greater action on the end of the flap valve adjacent the port D than it does on the end opposite the passage E. This may be accomplished either by making the passage D of larger diameter than the passage E or by positioning the pivot of the flap valve nearer to the passage E. The same result may also be accomplished by making the part of the flap valve itself opposite the passage D of larger mass so that if the fluid pressure against opposite ends of the flap valve be equal to greater mass of one end of the flap mass will normally keep it in the position shown in Fig. 2, but such greater mass should not be sufficient to prevent the action of the fluid in the passage E from opening the valve when there is no fluid pressure in the passage D.

In the example according to Figs. 5–8 the flap A' is arranged in a separate casing C' pivoted on the pin B' and arranged on the circumference of the coupling or gear member K. The casing C' is equipped with holes O and P opposite the ports D and E. These holes O and P serve as outlet for the fluid and at the same time facilitate observation of the proper functioning of the flap.

Both sides of the flap are of approximately equal length. The side of the flap which is opposite to the emptying port E carries a face Q which is adapted to close the outer opening P. The outer edge of the end portion of the flap opposite the control port D is formed in such a manner that its far side is guided by a facing R so as to minimize clearance losses between the end of the flap and the wall of the casing C'. The control opening D therefore does not communicate directly with the outer opening O except through the small hole J' through which any fluid contained in the control port D will escape during the emptying process.

This latter arrangement has the very important advantage that in case the fluid pressure of the control oil in the port D should diminish or cease for some reason, the coupling cannot be emptied by inadvertently opening the emptying port E. In case the control oil should fail, the facing Q of the closing flap will tightly seal the exhaust opening P immediately. The clearances between the flap and the casing C' are so small that no appreciable oil quantity can leak out through the opening O.

In this construction the area of the passage D is smaller than the area of the passage E, and the mass of that part of the flap valve which is juxtaposed to the passage E is larger than the part juxtaposed to the passage D.

The functioning of the flap when filling or emptying a fluid coupling or hydraulic gear corresponds to the one described for the example given in Figs. 1–4.

In the constructions shown in Figs. 5 to 8 inclusive no fluid is supplied to the control channel D when the coupling is being filled. The fluid is delivered directly into the coupling through the supply pipe G and the radial passages H. From the coupling the fluid passes into the channel E so that the part of the flap which is juxtaposed to the aperture P moves outwardly and closes the outlet port as shown in Fig. 6. When the coupling is to be emptied fluid is supplied through the passages M and D and this fluid acts on the part of the flap valve which is juxtaposed to the opening O. Since the area of resistance on this side of the flap valve is appreciably larger than on the other side where the liquid can flow around the end of the flap and where the closing face Q is smaller, the part of the flap which is opposite to the passage D will be moved outwardly by fluid pressure thus opening the aperture P to permit rapid emptying of the coupling.

Having thus described our invention what we claim as new and desire to secure by Letters Patent is:

1. A hydraulic power transmitter having rotatable driving and driven members providing a liquid circuit, one of said members having a discharge port for liquid from said circuit, a second port adjacent to said first mentioned port, and a double flap valve pivoted between said ports and adapted to be operated upon by fluid delivered through either, to open or substantially close said discharge port, the portion of the flap valve opposite the second mentioned port being larger than that adjacent to the first mentioned port, whereby said valve opens said discharge port when the fluid pressures in said ports against said valve are equal.

2. A hydraulic power transmitter having rotatable driving and driven members providing a liquid circuit, one of said members having a discharge port for liquid from said circuit, a second port adjacent to said first mentioned port, and a double flap valve pivoted between said ports and adapted to be operated upon by fluid delivered through either and adapted to open or substantially close said discharge port, the second mentioned port being larger than the first mentioned port, whereby said valve opens said discharge port when the fluid pressures in said ports against said valve are equal.

3. A hydraulic power transmitter having driving and driven members providing a liquid circuit, one of said members having a discharge port for liquid from said circuit, a second port adjacent to the said first mentioned port, and a double flap valve pivoted between said ports and having one end portion adapted to be operated upon by fluid delivered through said discharge port and to substantially close said port, and the other end portion adapted to be operated upon by fluid delivered through the second mentioned port and to permit continued leakage of fluid delivered through the second mentioned port.

4. A hydraulic power transmitter having driving and driven members providing a liquid circuit, one of said members having a discharge port for liquid from said circuit, a second port adjacent to said first mentioned port, and a double flap valve pivoted between said ports and adapted to open or substantially close said discharge port and to be operated upon by fluid delivered through either, said flap valve having a small aperture registering with said second mentioned port.

5. A hydraulic power transmitter having driving and driven members providing a liquid circuit, and a double flap valve mounted on the periphery of one of said members, said last mentioned member having a passage independent of said circuit and leading from the axis of said member, a second passage communicating with the liquid circuit of said members, and means for delivering a fluid to the inner end of said first passage, said passages terminating adjacent to opposite end portions of said flap valve, said flap valve being adapted to tightly close the passage leading from said liquid circuit or to substantially but not completely close the passage leading from said axis.

6. A hydraulic power transmitter including driving and driven members forming a liquid circuit, one of said members having a port at the periphery communicating with said circuit and permitting the discharge of fluid from the latter, a shaft carrying one of said members and having two separate passages extending lengthwise thereof, one of said passages of said shaft communicating with said circuit for filling the latter, means for delivering fluid from the other of said passages of the shaft to the periphery of the member having said port, and a valve for closing either said port or said last mentioned passage, whereby upon the delivery of fluid under pressure through said last mentioned passage said valve closes said port to prevent the escape of fluid from said fluid circuit.

7. A hydraulic coupling having driving and driven members providing a liquid circuit, means for supplying liquid to said circuit, one of said members having a discharge port for liquid from said circuit, a double flap valve pivoted intermediate of its ends and having one end portion serving to open or close said port, and means independent of the supply of liquid to said circuit for delivering fluid into engagement with the other end of said flap valve to move said valve and control said discharge port.

8. A hydraulic coupling having rotatable driving and driven members providing a liquid circuit, one of said members having a discharge port for liquid from said circuit, a second port adjacent to said first mentioned port, a double flap valve pivoted between said ports and having its opposite ends juxtaposed to said ports and one end adapted to open or substantially close said discharge port, and means for delivering fluid to said second port to control the position of said flap valve and thereby permit or substantially prevent discharge of liquid from said liquid circuit.

9. A hydraulic coupling having rotatable driving and driven members providing a liquid circuit, one of said members having a discharge port for liquid from said circuit, a second port adjacent to said first mentioned port, a double flap valve pivoted between said ports and having its opposite ends juxtaposed to said ports and one end adapted to open or substantially close said discharge port, the portion of the flap valve juxtaposed to one of said ports being of greater mass than the portion adjacent to the other of said ports, whereby the action of centrifugal force on said flap valve tends to hold it in one limiting position, and means for delivering fluid to the second port to reverse the position of said valve.

10. A hydraulic coupling having rotatable driving and driven members providing a liquid circuit, a valve casing secured to the periphery of one of said members and having an outlet port, a double flap valve pivotally mounted within said valve casing and having one end portion adapted to close or open said port, said member having a discharge passage from said liquid circuit to the end of said casing having said discharge port, and said member having a second passage leading to said valve casing adjacent to the opposite end of the latter, and means for delivering fluid through said last mentioned passage for operating said valve to open or close said discharge port.

GUSTAV BAUER.
CARL SCHMIESKE.